United States Patent [19]

Kobayashi

[11] Patent Number: 4,641,553

[45] Date of Patent: Feb. 10, 1987

[54] CONTROL SYSTEM AND METHOD FOR A POWER DELIVERY SYSTEM HAVING A CONTINUOUSLY VARIABLE RATIO TRANSMISSION

[75] Inventor: Hideyuki Kobayashi, Toyota, Japan

[73] Assignee: Aisin Seiki Kabushiki Kaisha, Kariya, Japan

[21] Appl. No.: 771,842

[22] Filed: Sep. 3, 1985

[30] Foreign Application Priority Data

Sep. 13, 1984 [JP] Japan ............................ 59-190667

[51] Int. Cl.⁴ ...................... B60K 41/12; B60K 41/18
[52] U.S. Cl. ...................................... 74/866; 74/871; 74/877
[58] Field of Search ................. 74/866, 870, 871, 877

[56] References Cited

U.S. PATENT DOCUMENTS

| Re. 24,347 | 6/1955 | Miner | 474/11 |
|---|---|---|---|
| 2,131,157 | 9/1938 | Almen et al. | 74/472 |
| 3,008,341 | 11/1961 | Cobb | 74/472 |
| 3,044,316 | 7/1962 | Forster | 74/472 |
| 3,256,747 | 6/1966 | Kempson | 74/472 |
| 3,368,426 | 2/1968 | Karig et al. | 74/865 |
| 3,552,232 | 1/1971 | Kress | 74/689 |
| 3,616,706 | 11/1971 | Shimamoto | 474/11 |
| 4,008,567 | 2/1977 | Hirsch | 60/39.28 P |
| 4,023,442 | 5/1977 | Woods et al. | 74/863 |
| 4,091,690 | 5/1978 | Miyao | 74/865 |
| 4,107,776 | 8/1978 | Beale | 364/431 |
| 4,152,947 | 5/1979 | van Deursen et al. | 474/11 |
| 4,161,894 | 7/1979 | Giacosa | 74/863 |
| 4,220,059 | 9/1980 | Mizuno et al. | 74/865 |
| 4,229,998 | 10/1980 | Mizuno et al. | 74/865 |
| 4,241,618 | 12/1980 | Smirl | 74/863 |
| 4,246,807 | 1/1981 | Kofink | 74/872 |
| 4,253,347 | 3/1981 | Mizuno et al. | 74/862 |
| 4,281,567 | 8/1981 | Maurer | 74/866 |
| 4,368,653 | 1/1983 | Mizuno et al. | 74/868 |
| 4,371,050 | 2/1983 | Ikeura | 180/271 |
| 4,381,684 | 5/1983 | Himmelstein | 74/862 |
| 4,383,456 | 5/1983 | Ganoung | 74/866 |
| 4,389,910 | 6/1983 | Lockhart | 74/843 |
| 4,428,257 | 1/1984 | Meyerle et al. | 74/866 |
| 4,428,341 | 1/1984 | Hassler et al. | 123/350 |
| 4,438,664 | 3/1984 | Fiala | 74/866 |
| 4,445,603 | 5/1984 | Filsinger | 192/0.055 |
| 4,458,318 | 7/1984 | Smit et al. | 364/424.1 |
| 4,458,560 | 7/1984 | Frank et al. | 74/857 |
| 4,458,561 | 7/1984 | Frank | 74/865 |
| 4,459,878 | 7/1984 | Frank | 74/857 |
| 4,507,986 | 4/1985 | Okamura et al. | 74/866 |
| 4,515,040 | 5/1985 | Takeuchi et al. | 74/866 |
| 4,515,041 | 5/1985 | Frank et al. | 74/866 |
| 4,580,465 | 4/1986 | Omitsu | 74/866 |

FOREIGN PATENT DOCUMENTS

| 0093312 | 9/1983 | European Pat. Off. | 74/866 |
|---|---|---|---|
| 0182543 | 9/1983 | Japan | 74/866 |
| 0203258 | 11/1983 | Japan | 74/866 |

OTHER PUBLICATIONS

Stubbs, P. W. R., The Development of a Perbury Traction Transmission for Motor Car Applications, 8/80.
Beachley, N. H., Principles and Definitions for Continuously Variable Transmissions, with Emphasis on Automotive Applications, 8/80.
Porsche Features Engine and Driveline Efficiency, Automotive Engineering, 1/1982.
Raynard, A. E., et al., Design Study of Toroidal Traction CVT for Electric Vehicles, 1/1980.
Oliver, L. R., Design Equations for a Speed and Torque Controlled Variable Ratio V-Belt Transmission, 6/1980.
Ironside, John M., Continuously Variable Transmission Control, ©1980.

Primary Examiner—Kenneth J. Dorner
Assistant Examiner—Dirk Wright
Attorney, Agent, or Firm—Banner, Birch, McKie & Beckett

[57] ABSTRACT

A control system for continuously varying the transmission gear ratio of a stepless variable speed gear for use in an automobile has a reference driver circuit for delivering a signal indicative of a reference transmission gear ratio to pressure servo controllers according to signals produced by detecting running conditions of the automobile, a deceleration-judging circuit for judging the automobile to decelerate, and a deceleration control circuit for modifying the output signal from the reference driver circuit so as to conform to the transmission gear ratio determined by the speed of the automobile.

3 Claims, 15 Drawing Figures

FIG. 2 ENGINE PERFORMANCE MAP

SHEAVE ACTUATING CURVES

CONTROL SYSTEM AND METHOD FOR A POWER DELIVERY SYSTEM HAVING A CONTINUOUSLY VARIABLE RATIO TRANSMISSION

BACKGROUND OF THE INVENTION

This invention relates to a power delivery system having a continuously variable ratio transmission and, more particularly, to a control system and a control method for such a system, such as might be used in an automotive vehicle.

The quest for greater fuel economy of automotive vehicles has led to significant improvements in engine and transmission design and control. Continuously variable ratio transmissions (CVT) have shown particular promise in this regard. It will be appreciated that at any given vehicle speed, and for any needed propulsive force, a certain transmission ratio will provide maximum fuel economy for a given engine. In addition, for any given vehicle speed, one transmission ratio will permit maximum acceleration with that engine. Since a CVT with the proper ratio range can provide any desired transmission ratio, it is obviously attractive for automobiles from the standpoint of economy, low emissions and performance. If the mechanical efficiency of the CVT is high and its ratio range is wide enough, it can even be possible to have both maximum economy and maximum performance in the same vehicle. Among the obvious benefits are fully automatic operation, smooth, stepless and rapid response to driver demand, and quieter cruising.

Many different CVT configurations have been developed in the prior art. These include, for example, hydrostatic transmissions; rolling contact traction drives; overrunning clutch designs; electrics; multi-speed gear boxes with slipping clutch; and V-belt traction drives. Of these the V-belt traction drives appear attractive for small to medium size passenger car applications because of their compactness, lightness and simplicity of design. Basically, this type of CVT comprises a V-belt which interconnects a driver sheave and driven sheave the diameters of the sheaves being variable to change the ratio of the CVT. Recent advances in belt design have resulted in improved belt durability and longevity. If sheave movement can be properly controlled so as to avoid undue stresses on the belt, it is expected that a very long belt life can be achieved.

Many control schemes have been devised for engine-CVT systems in attempts to maximize fuel economy. These have been based on empirical analyses of individual engine performance, and the realization that, for any desired power output, there is an optimum combination of engine speed and torque which will result in minimum fuel consumption. This is illustrated in FIG. 2.

FIG. 2 is a typical performance map of a four cylinder spark ignition passenger car engine having a displacement of approximately 2.5 liters. The map is a plot of engine torque $T_E$ and brake horsepower BHP as a function of engine speed $N_E$. The dot-dash line near the top of the map is a plot of engine torque at full throttle. The series of curves in solid black lines are fuel consumption contours, indicating constant brake specific fuel consumption (BSFC) in lb.M/BHP-hr. Minimum fuel consumption occurs at a point designed by 0.4 pounds per horsepower-hour. The series of dashed lines indicate power output of the engine. The ideal operating line for low fuel consumption is indicated by the heavy solid line $f(N_E)$, this curve being a function of engine speed. The ideal operating line for low fuel consumption is purely a function of engine characteristics and is optimal regardless of vehicle road speed. Other ideal operating lines may appear on the performance map, for example, the ideal operating line for low emissions.

In a vehicle with a conventional, manually shifted gearbox, forward speed ratios usually are available in only four or five steps. The operating point of the engine on the performance map is determined by drive shaft speed, power or torque commanded, and transmission gear ratio. Since there are only a few gear ratios available in a typical transmission, the engine must be throttled much of the time. The engine must therefore operate most of the time at high BSFC values. In contrast, a CVT is able to vary its speed ratio continuously to allow the engine to run at wider throttle and lower BSFC values.

Perhaps the most difficult task demanded of a control system for an engine-CVT system is to maintain engine operation along the ideal operating line. This is due to the almost continuous transient nature of operation of an automotive vehicle, there being hardly ever a time when road load and commanded torque or power remain constant. Transient conditions usually are dealt with by a change in CVT ratio, engine speed and throttle. Prior art control systems, by their very nature, permit an excursion of engine operation away from the ideal operating line before returning back to it at steady state. An example of such an excursion is shown in FIG. 2 by dashed line X-Y-Z. The result is that engine operation approaches, but hardly ever is maintained on the ideal operating line. Two such prior art systems are illustrated in FIGS. 3 and 4.

FIG. 3 schematically illustrates a system devised by Peter Stubbs for British Leyland. This system is described in greater detail in Stubbs, "The Development of a Perbury Traction Transmission for Motor Car Applications", ASME Publication, No. 80-C2/DET-59 (August 1980). In this system, engine speed ($N_E$), throttle (ET) position ($\theta$) and CVT ratio (e) signals are all fed to a computer controller which has, in its memory, the engine operating characteristic for minimum fuel consumption. The computer controller generates, as a function of these variables, an engine control signal (Nc) for adjusting the position ($\theta$) of the throttle, and a ratio rate signal (Ec) which changes the ratio of the CVT. The throttle is under the direct control of the signal ($a$) from the vehicle accelerator pedal so that, while the engine control signal may vary the throttle position somewhat from that commanded by the driver, the throttle position still is primarily a function of commanded power or torque.

FIG. 4 is a schematic representation of the system devised by Miyao for Aisin Seiki Co., Ltd., Japan, This system is described in greater detail in U.S. Pat. No. 4,091,690. Here, as in the Stubbs system, engine throttle is primarily a function of commanded power or torque by direct connection with the accelerator pedal. The computer generates a ratio rate signal (Ec) to change the CVT ratio (R) as a function of measured throttle position ($\theta$) and engine torque (Te) and speed (Ne). Inherently sensed output torque (To) also affects the CVT ratio. Indicated by Re is the resistance that the vehicle experiences in traveling, such as road load.

In these, as well as in virtually all other engine-CVT control systems, throttle position is controlled directly by the vehicle accelerator pedal, or is a direct function of pedal position, as well as other parameters. Engine and transmission control usually are directly related to one another. Such control schemes permit engine operation during transients to vary from the ideal operating line. Excursions away from the ideal operating line result in less than optimum engine operation (e.g., excessive fuel consumption, or excessive emissions), until effective control is resumed by the system during steady state operation. As pointed out, earlier, however, most vehicular operation is transient in nature, rather than steady state, so that substantially all engine operation occurs off the ideal operating line. Emissions calibrations must therefore be made in a substantial portion of the engine performance map. Most prior art control systems also must be specifically tailored to particular engines. This requires numerous specially designed control systems for a fleet of differently powered vehicles. In addition, most prior art control systems cannot compensate for varying engine conditions, the result being vehicle driveability which varies with engine temperature, state of tune, age and altitude. Close duplication of conventional vehicle characteristics also is a problem with prior art CVT control schemes.

However, Japanese Patent Laid-Open No. 34057/1984 corresponding to U.S. Pat. No. 4,458,560 discloses a system which controls the transmission of an automobile completely independent of the control over the engine. This makes it easy to operate the engine along an ideal operating line. That is, the position of the engine throttle is completely independent of the position of the accelerator pedal. The position of the throttle, hence the torque delivered by the engine, is only a function of the rotational speed of the engine. This function can be modified to a desired form or relation, e.g., an ideal operating line for low fuel consumption, an ideal operating line for low emission of exhaust gas, and a composite ideal operating line for achieving both low fuel consumption and low emission of exhaust gas. The torque, horsepower, and other desired parameters of performance which are instructed by the accelerator pedal control the CVT ratio. The rotational speed of the engine depends on the load applied to the engine. This load is a function of the load applied by the road and, at the same time, a function of the CVT ratio. Accordingly, the position of the throttle is accurately adjusted according to the ideal functions whatever load is applied to the engine.

The present inventor has already proposed a control system in Japanese Patent Application No. 182543/1983 corresponding to U.S. patent application Ser. No. 06/656,776, still pending. This proposed system is based on the control system described just above and controls the engine and the CVT ratio in such a way that the engine always operates along an ideal operating line. When the clutch is engaged, the opening of the throttle is smoothly varied according to the lowest fuel consumption.

The fundamental control system uses signals indicative of the torque, the horsepower, and other desired parameters of performance as input signals to control the CVT ratio, the parameters being instructed by the accelerator pedal. Especially, the pressure servo in a driven member of the CVT is controlled according to the position of the accelerator/the velocity of the driving shaft ($\alpha/Nd_s$) The system proposed by the present inventor in the aforementioned Japanese Patent application No. 182543/1983 corresponding to U.S. patent application Ser No. 06/656,776 adopts the same principle. According to this control system, when the position of the accelerator pedal is high and the velocity of the driving shaft is low, the pressure $P_2$ delivered to the pressure servo in the driven member is high. Thus, the diameter of the sheave in the driven member is large, making the transmission gear ratio ($R = N_e/Nd_s$) large. As a result, a large accelerating force is obtained to start the vehicle. On the other hand, when the position of the accelerator pedal is low but the velocity of the driving shaft is high, the pressure $P_2$ delivered to the pressure servo in the driven member is low, making the diameter of the sheave in the driven member small. Then, the transmission gear ratio R assumes a small value, whereby the vehicle goes to steady-state running. Accordingly, this control system can be said to conform to the running condition.

However, this control system introduces the following problem when the driver releases the accelerator pedal to decelerate the running vehicle. As soon as the pedal is released while the vehicle is traveling, the pressure $P_2$ delivered to the pressure servo in the driven member drops to zero, making the diameter of the sheave in the driven member smaller. Then, the belt is shifted to a higher position. Under this condition, if the velocity drops nearly to a velocity region in which the clutch is disengaged, the engine load becomes excessive, causing knocking. This may eventually bring about engine stall. Further, when the driver tries to restart the vehicle, the engine load is excessive, because the belt is situated on the higher side. Hence, it is difficult to start the vehicle.

This control system introduces another problem when the driver releases the accelerator pedal while the vehicle is traveling, often for obtaining engine brake. However, a sufficient amount of engine brake is not provided.

SUMMARY OF THE INVENTION

The present invention is intended to remove the foregoing problems. It is the object of the present invention to provide a CVT control system which does not allow a transmission to shift to a higher side even if the accelerator opening approaches zero while the vehicle is traveling.

The CVT control system according to the invention comprises: a reference driver circuit for delivering a reference transmission gear ratio signal to a means for driving a stepless variable speed gear according to the signal produced by sensing running conditions, especially for delivering a signal that is a function of the accelerator opening to a driver means in a driven member; a deceleration-judging means for judging the vehicle to decelerate, based on an accelerator signal and on a transmission gear ratio signal while the vehicle is traveling; and a deceleration control means that receives both the signal from the deceleration-judging means and a vehicle speed signal, for example, a signal indicative of the velocity of the driving shaft, to modify the output signal from the reference driver circuit so as to conform to the transmission gear ratio required by the vehicle speed.

The fundamental control system controls the throttle opening $\theta$ as a function of the rotational speed $N_E$ of the engine. Also, the system controls the driving means in a driving member of a stepless variable speed gear, i.e., the pressure servo controller in the driving member, as a function of the CVT ratio R and also as a function of the torque $T_0$. Further, the system controls the driving means in a driven member, i.e., the pressure servo controller in the driven member, as a function of the ratio of the velocity of the driving shaft $Nd_s$ to the accelerator position $\alpha$.

The control system which has been already proposed by the present inventor in Japanese Patent application No 182543/1983 corresponding to U.S. patent application Ser. No. 06/656,776, still pending, and which is added to the aforementioned fundamental control system controls the throttle opening $\theta$ as a function of the accelerator position $\alpha$, or the position to which the accelerator pedal has been depressed, at the start-up. Also, it controls the pressure servo controller in the driving member as a function of the accelerator position $\alpha$. The system shifts to the fundamental control system when the rotational speed $N_E$ of the engine reaches the ideal operating line which is found from $N_E = f(\theta)$.

The present invention is used for a CVT control system that controls the driving means in the driven member of a CVT as a function of the accelerator position $\alpha$. Especially, the invention is used for the fundamental control system described above and for the start-up control system added to the fundamental control system.

The control system according to the invention is started by the aforementioned fundamental control system or start-up control system, and in which the throttle opening $\theta$ is controlled as a function of the rotational speed $N_E$ of the engine. The pressure servo controller in the driving member is controlled as a function of the CVT ratio R and also as a function of the torque $T_0$. The servo controller in the driven member is controlled as a function of the ratio of the driving shaft velocity $Nd_s$ to the accelerator position $\alpha$ and also as a function of the engine rotational speed $N_E$. Under these conditions, when the driver releases the accelerator pedal, if the deceleration-judging means receives both a signal signifying that the accelerator position $\alpha$ is less than a predetermined value $\alpha$ and a signal signifying that the CVT ratio R is less than a predetermined value $R_{max}$, then it causes the deceleration control means to start modifying the transmission gear ratio, based on the signals applied to both controllers. The deceleration control means determines the optimum transmission gear ratio from the driving shaft velocity that can be converted into the vehicle velocity. Then, it adds a modifying signal to the reference signal to make the present gear ratio closer to this optimum gear ratio and applies the resultant signal to both controllers. The modifying signal may be based on either time t or other variable. When both controllers receive the output signal, the diameter of the sheave on the driving member constituting a stepless variable speed gear is increased, while the diameter of the sheave on the driven member is reduced to thereby decelerate the vehicle. The gear ratio is maintained at the optimum transmission gear ratio determined by the deceleration control means until the accelerator position $\alpha$ exceeds a predetermined value $\alpha_0$. If the vehicle velocity reaches a velocity region in which the clutch is to be disengaged, the clutch is disengaged, Then, the stepless variable speed gear is on standby at a transmission gear ratio that allows the vehicle to restart, i.e., $R_{max}$. This gear ratio corresponds to the gear ratio of first speed of a gear type transmission.

When the driver steps on the accelerator pedal and the predetermined position $\alpha_0$ is exceeded, the control according to this control system ceases. Then, both controllers are controlled by the fundamental control system. When the vehicle moves on a down slope and the driver releases the accelerator pedal, the control system increases the transmission gear ratio in a continuous manner, thus providing engine brake.

Other features of the invention will appear in the course of the description thereof which follows.

DETAILED DESCRIPTION OF THE INVENTION

Figure 6:
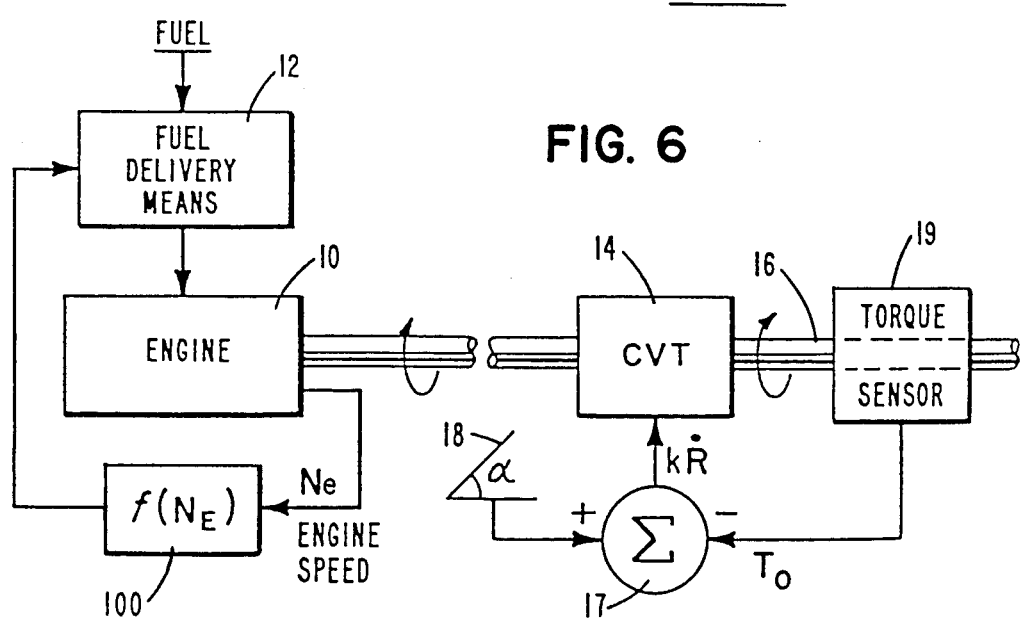
FIG. 6 is a schematic illustration showing the functional relationships of the components of an engine-CVT control scheme according to the invention.
Figure 5:
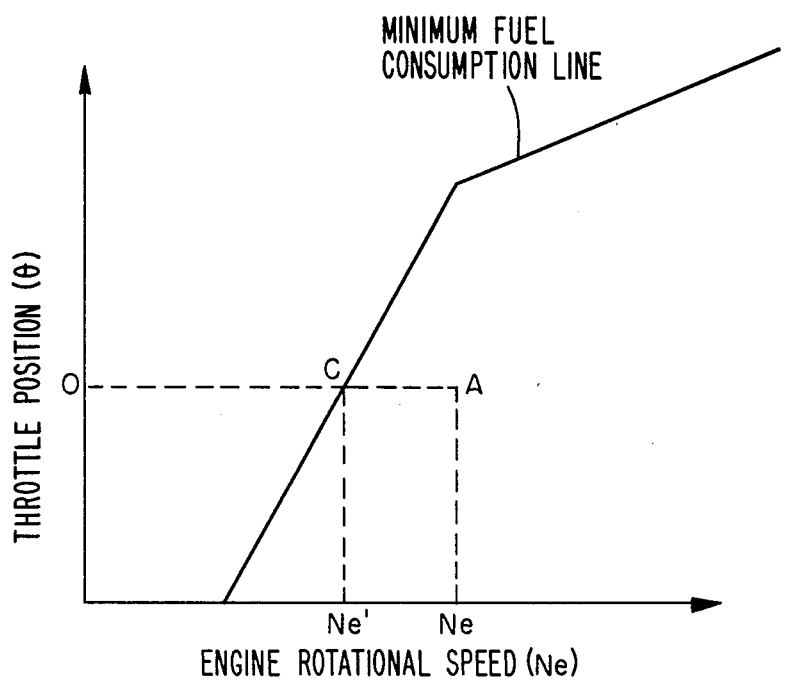
FIG. 5 is a graph showing the characteristic of the lowest fuel consumption line.

FIGS. 5 and 6 illustrate the functional relationships of the components of the invention. An engine 10 is drivingly coupled to a continuously variable ratio transmission (CVT) 14 through a clutch or fluid coupling (see FIG. 1). Fuel is fed to engine 10 by a fuel delivery means 12, which may be the throttle and fuel jets of a conventional carburetor, a fuel injection system or the like. Output shaft 16 delivers power and torque from the engine and CVT. The ratio of the CVT is set by a CVT ratio controller 17, which generates a rate of change of ratio signal kR as a function of output torque $T_0$ measured by torque sensor 19 and commanded power or torque $\alpha$ commanded by accelerator pedal 18. Other parameters indicative of engine-CVT system performance may be used by ratio controller 17 to effect a change of CVT ratio in a similar manner. For example, rather than using desired output power or torque and measured actual output torque, commanded and measured vehicle acceleration, output shaft accelerator, or other parameters could be used. In this preferred embodiment, however, CVT ratio is strictly a function of commanded power or torque and measured output torque, and is completely independent of engine operation. Engine control, on the other hand, is provided by an engine controller 100 which adjusts fuel delivery means 12 in accordance with measured engine speed $N_E$. This relationship may desirably be the ideal engine operating line for low fuel consumption.

Figure 1:
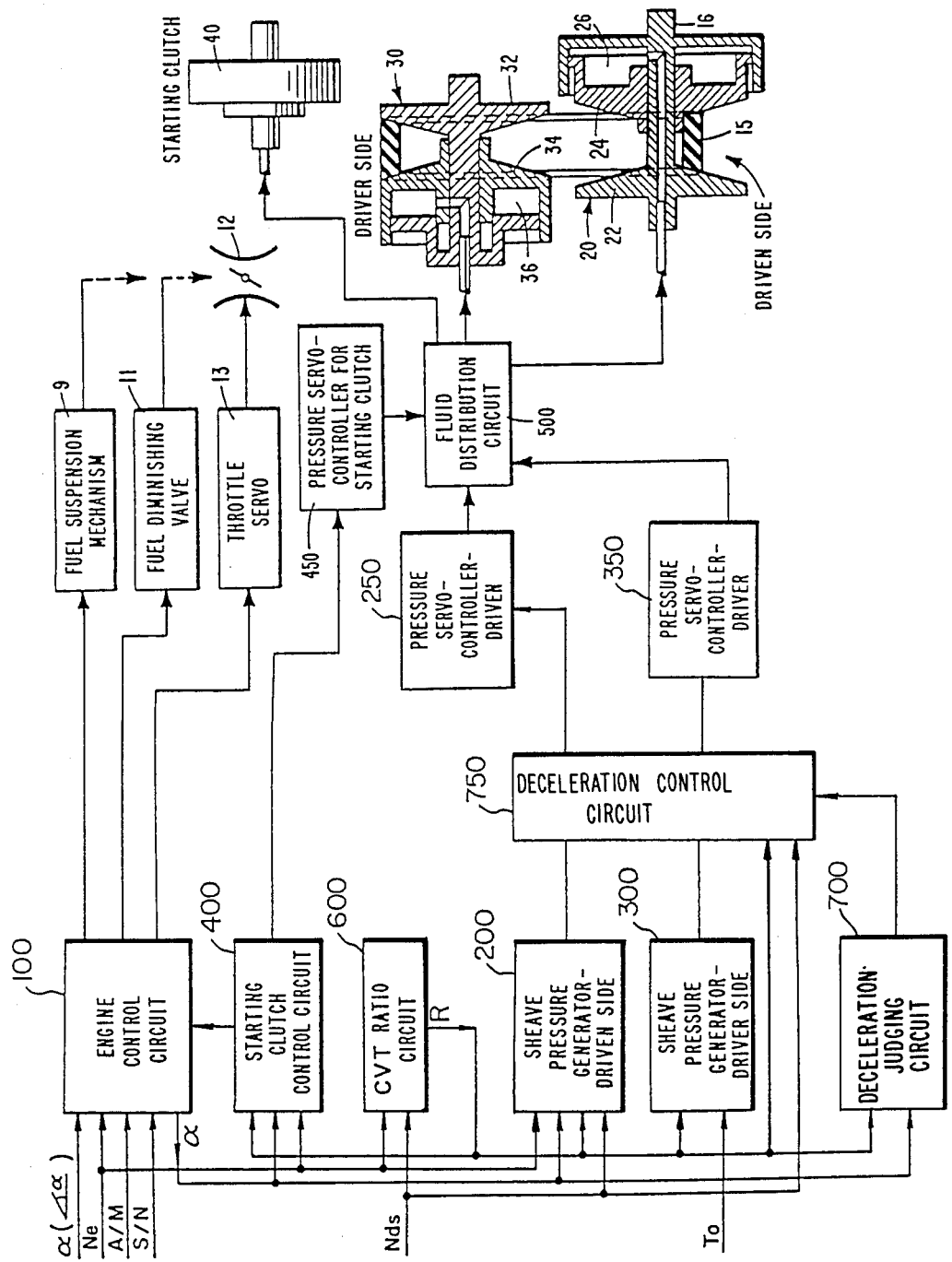
FIG. 1 is a schematic illustration showing the entire control system of the invention and its relationship to the CVT sheave and belt drive, and the vehicle starting clutch.

FIG. 1 schematically illustrates the entire control system in greater detail. The particular type of CVT illustrated in FIG. 1 is the variable diameter pulley, V-belt traction drive type having a driven sheave 20 connected to output shaft 16 and a driver sheave 30 which is coupled to engine 10. Belt 15 interconnects sheaves 20 and 30 to transmit motive power therebetween. Sheaves 20 and 30 are hydraulically actuated by pressurized fluid to vary the driving diameters. Sheave 20 has an axially fixed portion 22 and an axially movable portion 24. Pressurized fluid in a fluid chamber 26 behind movable portion 24 provides the axial force required to maintain portions 22 and 24 at a fixed distance from one another (i.e., to hold the driving diameter of sheave 20 constant), and to move portion 24 toward or away from portion 22 to vary the driving diameter. Similarly, sheave 30 has an axially fixed portion 32 and a movable portion 34 which is under the influence of fluid pressure in chamber 36. Proper pressures in chambers 26 and 36 to keep belt 15 under proper tension are maintained by the control system, as described below.

The position of throttle (fuel delivery means) 12 is controlled by a throttle servo 13 which receives signals from engine control circuit 100. During certain transient operations (described below) fuel delivery may be diminished by a fuel diminishing valve 11, or fuel delivery may be suspended completely by a fuel suspension mechanism 9. The fuel diminishing and suspension functions may be performed, for example, by a single solenoid valve operable in variable modes. Engine control circuit 100 is responsive to inputs from the accelerator pedal ($\alpha$), engine speed ($N_E$), a manual override switch which permits operation in the automatic (AUT) or manual (MAN) mode, and a start/neutral switch (S/N) which insures that the vehicle will remain stationary when the engine is started.

In fundamental control system, fluid pressure for activating the driven sheave is provided by a sheave pressure generator 200 which acts through a pressure servo controller 250 and a fluid distribution circuit 500. Similarly, fluid pressure for activating the driver sheave 30 is provided by sheave pressure generator 300 acting through a servo controller 350 and fluid distribution circuit 500. Pressure generator 200 is responsive to inputs of engine speed $N_E$, accelerator position $\alpha$, drive shaft speed $N_{DS}$ measured by a sensor associated with drive shaft 16, and CVT ratio R. Ratio R is generated by CVT ratio circuit 600 and is the quotient of engine speed $N_E$ divided by drive shaft speed $N_{DS}$.

While the vehicle is in motion, if the driver releases the accelerator pedal, the transmission gear ratio is controlled by both deceleration-judging circuit 700 and deceleration control circuit 750. First, judging circuit 700 ascertains whether certain conditions are satisfied. If satisfied, the deceleration control circuit increases or decreases the reference hydraulic pressure developed at that time by both pressure generators 200 and 300 according to a certain function, and allows the resulting pressure to act on both controllers 250 and 350.

A starting clutch 40 is provided which couples engine 10 and CVT 14. Clutch 40 is disengaged when the vehicle is stationary, and is partially engaged during slow vehicle operation, gradually approaching full engagement, which occurs as described below at a predetermined point of operation. Starting clutch 40 is controlled by a control circuit 400 which is responsive to accelerator pedal position $\alpha$, engine speed $N_E$ and the auto/manual switch, through servo controller 450 and fluid distribution circuit 500.

Figure 2:
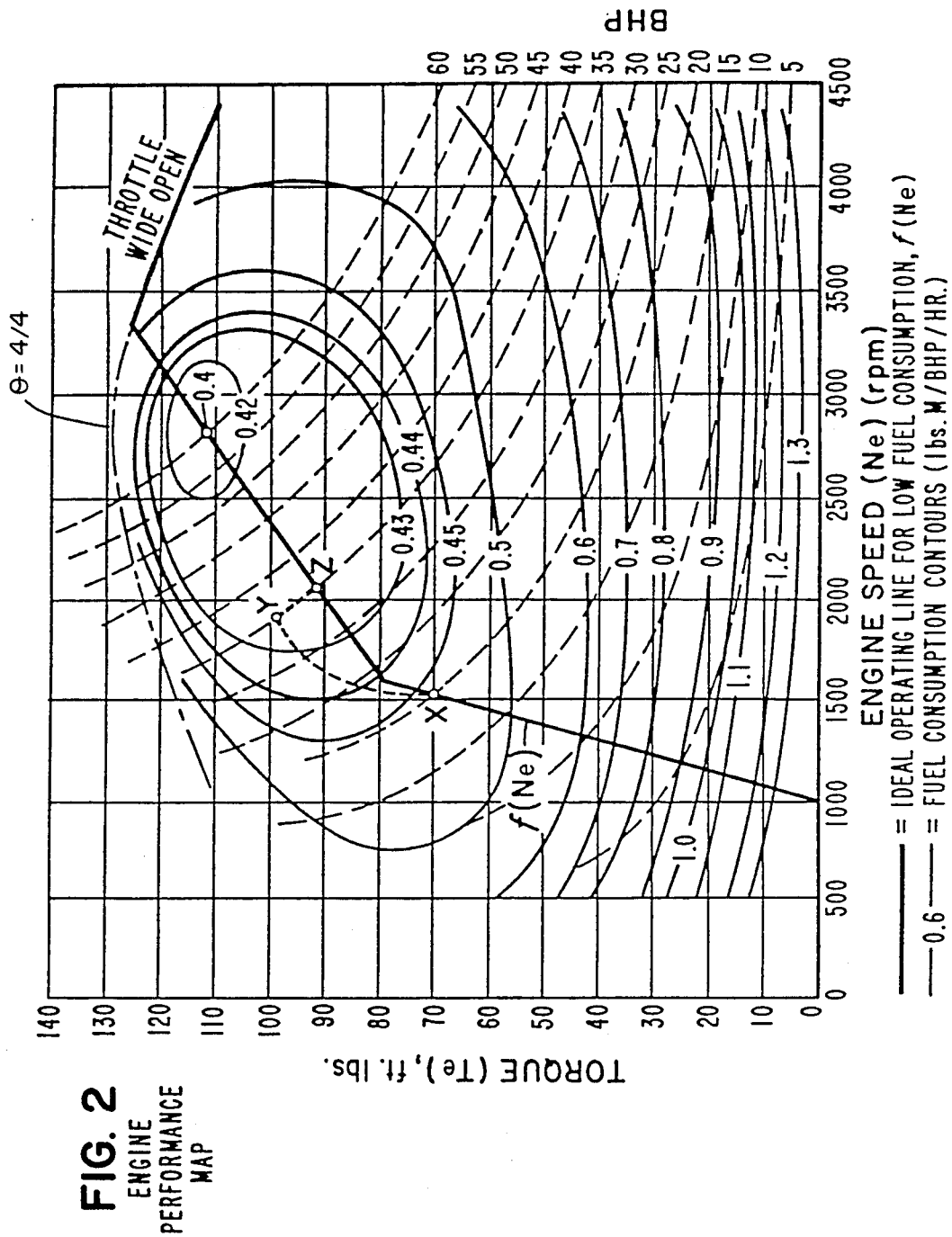
FIG. 2 is the performance map of a typical four cylinder passenger car engine having a displacement of approximately 2.5 liters.
Figure 3:
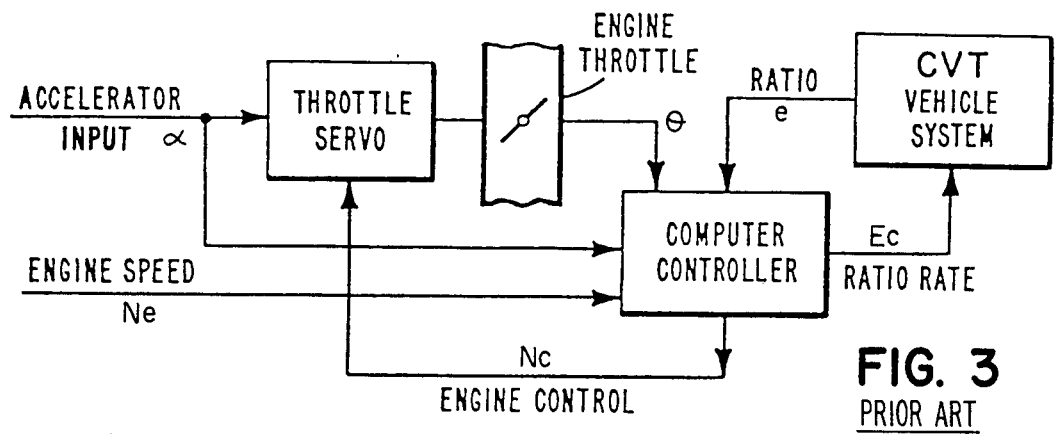
FIGS. 3 and 4. illustrate two forms of prior art engine-CVT control schemes.
Figure 4:
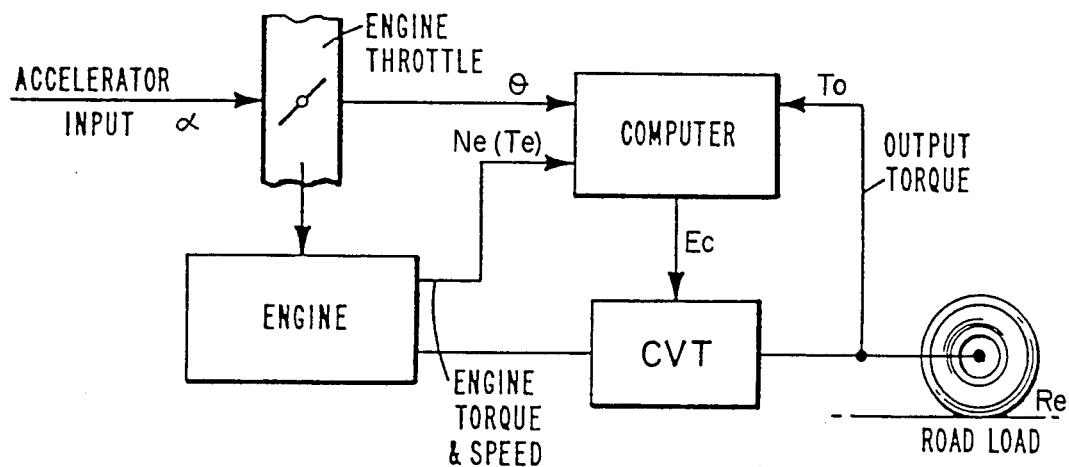
Figure 8:
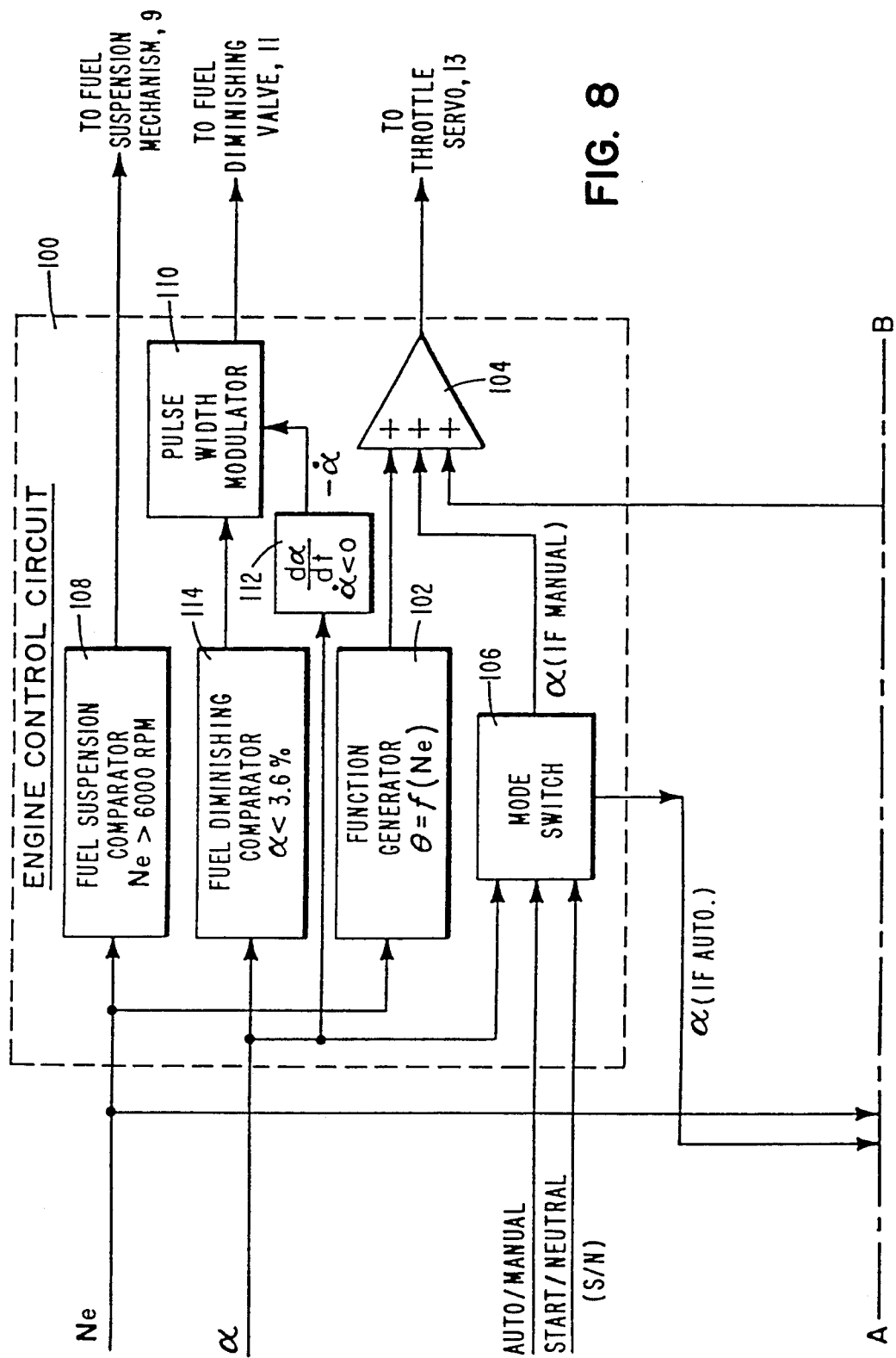
FIG. 8 primarily relates to the engine control circuit.
Figure 9:
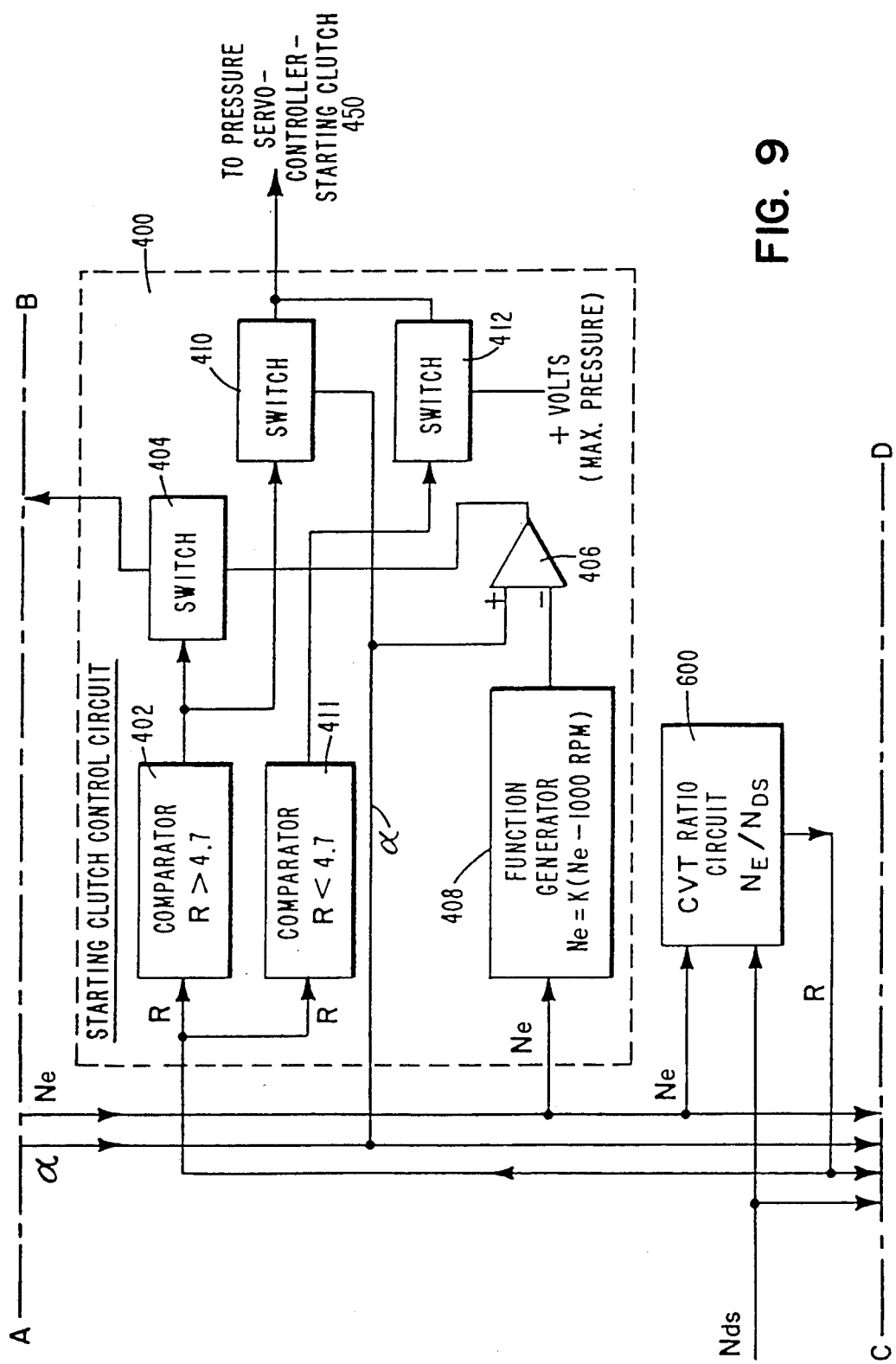
FIG. 9 primarily relates to the starting clutch control circuit.
Figure 10:
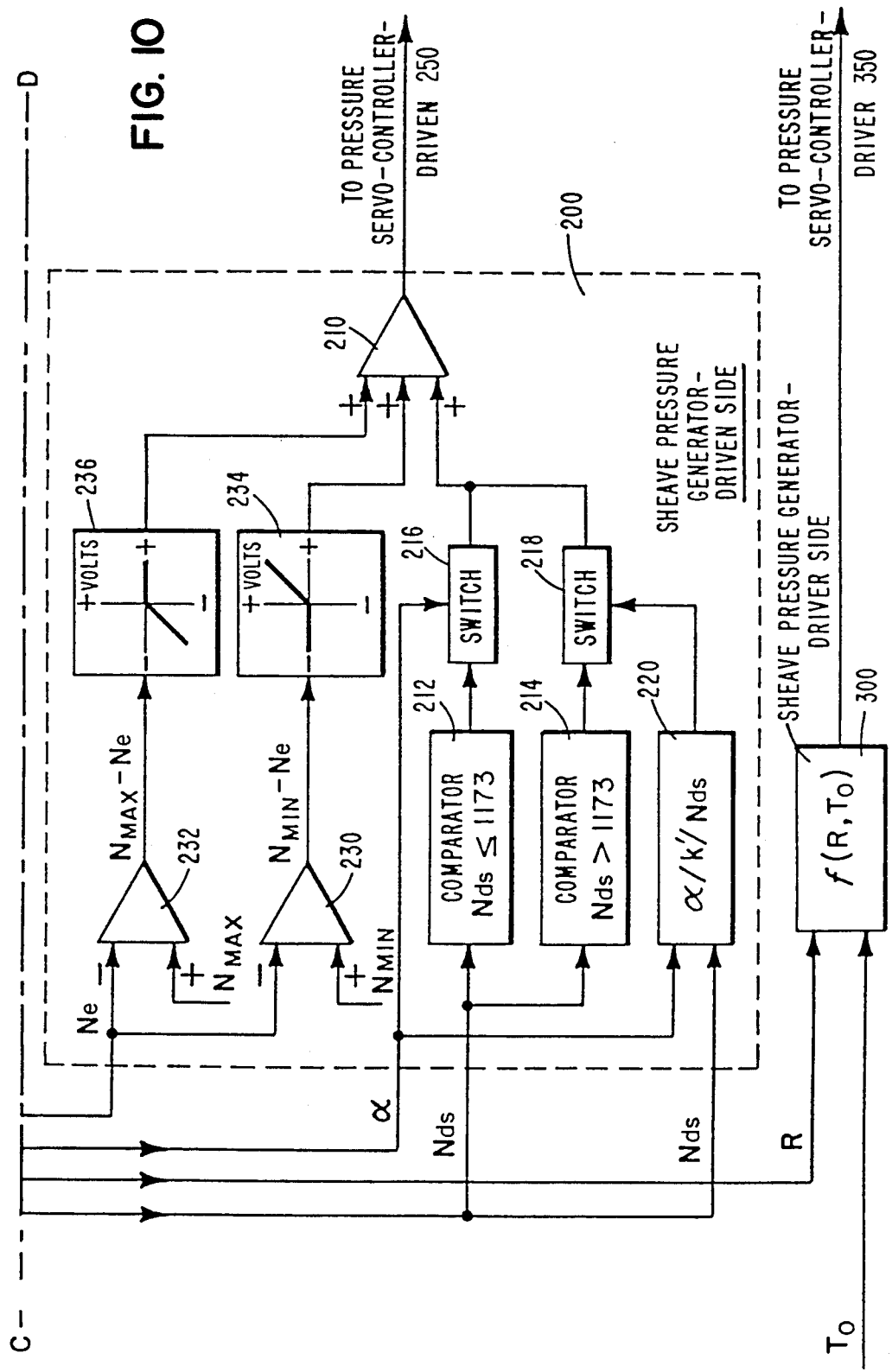
FIG. 10 primarily relates to the sheave pressure generators.

FIGS. 8, 9 and 10 schematically illustrate in greater detail the functional relationships of the components illustrated in FIG. 1. FIG. 8 is primarily directed to the engine control circuit 100. A key element of control circuit 100 is function generator 102, which may generate a function representative of any desired engine operating characteristic. For this embodiment the function $\theta$ is chosen as the ideal engine operating line for low fuel consumption. $\theta$ represents throttle angle, which is proportional to desired engine output torque. FIG. 2 graphically illustrates this function as $f(N_E)$. The value of the function produced by generator 102 is fed directly to throttle servo 13 via amplifier 104. In the event the automatic control system is disabled, it is possible to switch to a manual mode through mode switch 106. In the manual mode, accelerator position $\alpha$ is directly communicated to throttle servo 13 via amplifier 104. The start/neutral switch S/N also operates through mode switch 106.

A fuel suspension comparator 108 provides for engine overspeed control, which may tend to occur upon vigorous acceleration or if there is a malfunction in the control system. Comparator 108 compares engine speed $N_E$ to the maximum permissible engine speed, for example, 6000 rpm. If $N_E$ is greater than 6000 rpm, fuel suspension mechanism 9 is activated to suspend delivery of fuel to engine 10. Fuel suspension mechanism 9 may be, for example, a solenoid cutoff valve.

Another engine speed control is provided to counteract the inherent tendency of the vehicle to speed up when the accelerator pedal is released. This phenomenon occurs upon deceleration because the vehicle inertia becomes coupled to the inertia of a relatively unthrottled engine through a transmission whose ratio is changing towards overdrive. This undesirable tendency is even more pronounced when the accelerator pedal is released suddenly and completely. This anomalous behavior is prevented by reducing fuel flow to the engine when pressure on the accelerator pedal is relieved, the reduction of fuel flow being proportional to the rate at which pedal position decreases ($-\dot{\alpha}$), and by reducing fuel flow even further when the accelerator pedal position $\alpha$ drops to below 3.6% of full excursion. To accomplish this control, a pulse width modulator 110 controls fuel diminishing valve 11, the duty cycle (i.e., the percentage of the pulse cycle during which fuel diminishing valve is held open) of modulator 110 being inversely proportional to the rate at which pedal position $\alpha$ decreases ($-\dot{\alpha}$). $-\dot{\alpha}$ is derived from a differentiator 112 only if $\dot{\alpha}$ is less than zero. In addition, a fuel diminishing comparator 114 reduces the duty cycle of modulator 110 to or near zero when pedal position $\alpha$ drops to below 3.6%.

FIG. 9 relates primarily to the starting clutch control circuit 400. It will be appreciated that some type of coupling must be provided between the engine and the CVT in order to permit the engine to idle while the vehicle is stationary. A fluid coupling could be used, but the mechanical losses inherent in such a device are antithetical to the desired objective of maximizing fuel economy. A torque converter with a lock-up clutch would be an improvement, but a mechanical clutch is preferred, and one which is hydraulically actuated would be well suited for this purpose. The object here, as in the conventional automobile, is to totally disengage the clutch when the vehicle is stationary, and to gradually engage it to begin vehicle movement and propressively engage the clutch further as the vehicle speed increases. To this end the measured transmission ratio R (which is computed as the quotient of engine speed $N_E$ and drive shaft speed $N_{DS}$ by ratio circuit 600) is fed to a comparator 402. Comparator 402 closes switch 404 when R exceeds 4.7 to deliver the signal from amplifier 406 to throttle servo 13 via amplifier 104. This signal is equal to $\alpha - N_E'$, is a function produced by generator 408 equal to K ($N_E$ − 1000 rpm). Thus, the accelerator pedal 18 is coupled directly to throttle 12 in a variable way defined by $\alpha - N_E'$. The constant K is selected such that engine speed cannot exceed 2500 rpm if the clutch is not fully engaged. This direct coupling of accelerator pedal to throttle allows an input to be provided to the system to initiate movement of the vehicle from a stationary position.

Comparator 402 also closes switch 410 to transmit pedal position $\alpha$ directly to the clutch pressure servo controller 450. Hence, the degree of engagement of clutch 40 is proportional to pedal position up to the point where ratio R equals 4.7. During this period the degree of direct control of the accelerator pedal over throttle 12 diminishes as engine speed increases in accordance with the above-described relationship.

Figure 11:
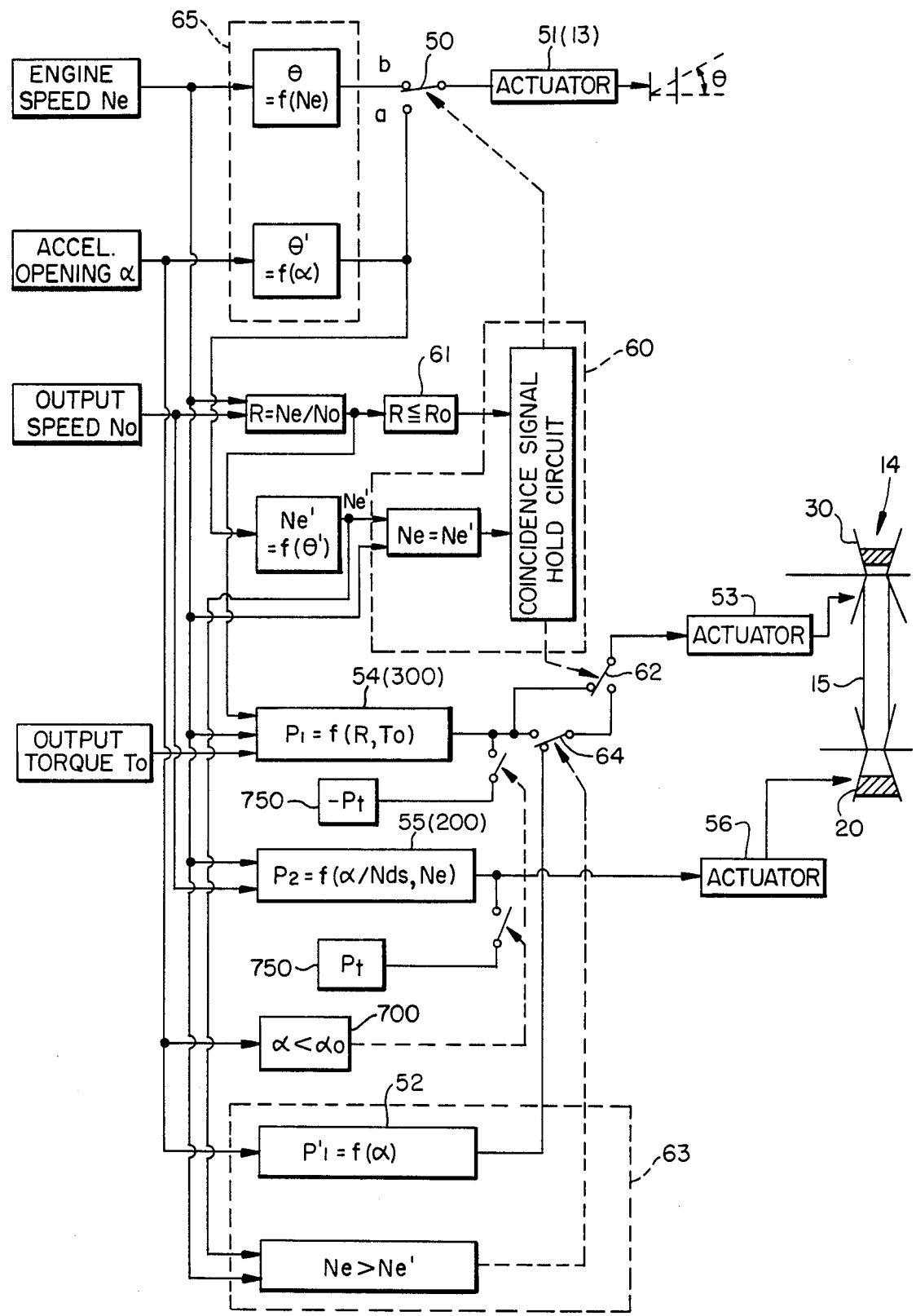
FIG. 11 is a block diagram showing the whole system including the CVT control system according to the invention.

Referring to FIG. 11, when the vehicle is started, switch 50 is switched from the shown condition to contact a. Then, actuator 51 (13) controls the position of the throttle in such a way that the throttle opening $\theta$ (=f ($\theta$)) varies in proportion to the accelerator opening.

Also shown in FIG. 11 are sheave control circuits 54 and 55 for the driving and driven members, respectively. These control circuits 54 and 55 act as reference driver circuits for delivering operating signals to actuators (driving means) 53 and 56 for driving sheave 30 and driven sheave 20, respectively.

Selector circuit 60 receives a signal signifying that clutch 40 has been engaged, from judging circuit 61. Note that $R_0$ indicates the maximum value of of R that is equal to 4.7. When the rotational speed $N_E$ of the engine coincides with the rotational speed at the lowest fuel consumption corresponding to the throttle opening $\theta$, selector circuit 60 switches switch 50 such that the throttle is controlled at the lowest fuel consumption corresponding to the rotational speed of the engine. When the signal signifying that the clutch has been engaged is applied to selector circuit 60, if the rotational speed of the engine is equal to the rotational speed on the lowest fuel consumption line, then selector circuit 60 returns switch 62 to its original driven sheave control circuit 54 (300).

When the rotational speed of the engine does not coincides with the rotational speed of the engine at the lowest fuel consumption, i.e., the intended rotational speed of the engine, before clutch 40 is fully engaged, selective switching means 63 brings switch 64 to the shown condition to operate actuator 52 for the driving member and modifies the CVT ratio via the actuator 53 for the driving member.

When starting clutch 40 is engaged, if the minimum fuel consumption line shown in FIG. 5 indicates that the detected rotational speed $N_E$ of the engine is higher than the minimum fuel consumption rotational speed $N_E'$ of the engine corresponding to the accelerator opening at that time, then driving sheave control circuit 52 acting as a modifying driver circuit operates actuator 53 as it is to reduce the diameter of driving sheave 30. Thus, the load on the CVT is increased so that the rotational speed $N_E$ of the engine may be reduced until it reaches the minimum fuel consumption line. Since the output signal from control circuit 52 is a function of the accelerator position $\alpha$, the rotational speed $N_E$ of the engine will soon arrive at the line.

When ratio R drops below 4.7, switches 404 and 410 open, and comparator 411 closes switch 412 to deliver maximum pressure to the clutch servo controller 450. Maximum pressure causes full engagement of the clutch. As the vehicle accelerates beyond this point, it is under total automatic control. That is, when the rotational speed $N_E$ of the engine is on the minimum fuel consumption line and starting clutch 40 is fully engaged, switch 50 is switched to contact b as shown in FIG. 11. Then, actuator 51 controls the throttle opening $\theta$ (=f ($N_E$)) to provide the lowest fuel consumption corresponding to the rotational speed $N_E$ at that time.

It can be seen that if no start/neutral S/N switch were provided, any depression of accelerator pedal 18 upon startup would cause engagement of clutch 40 and a forward lurch of the vehicle. The S/N switch therefore effectively disables the effect of $\alpha$ on clutch 40 to permit safe startup.

FIG. 10 relates primarily to the sheave pressure generator for the driven sheave 200 and the sheave pressure generator for the driver sheave 300. Pressure generator 200 includes circuitry which changes the transmission ratio to increase the load on the engine if the engine tends to exceed the maximum operating speed of 5500 rpm ($N_{MAX}$). Also provided is circuitry for changing the transmission ratio to decrease the load on the engine should the engine speed tend to decrease below the idle speed of 1000 rpm ($N_{MIN}$). This is accomplished by means of summing amplifiers 230, 232 and clipping circuits 234, 236. Summing amplifier 232 and clipping circuit 236 act to reduce pressure on the driven sheave 200 to increase the load on the engine. Amplifier 232 receives $N_E$, applied to its negative input terminal, and $N_{MAX}$, applied to its positive input terminal, and produces a summed output signal $N_{MAX} - N_E$. This summed output is applied to clipping circuit 236 which is a non-linear device having the characteristic shown in FIG. 10. This device can be, for example, a reverse biased diode which produces a negative substantially linear output for negative excursions of its input signal and a zero output for positive excursions.

Consequently, if $N_E$ exceeds $N_{MAX}$, the input signal applied to circuit 236 will be negative, thereby resulting in a negative output signal. This negative output signal is then applied to summing amplifier 210 to reduce the value of its summed output signal in proportion to the amount $N_E$ exceeds $N_{MAX}$. As a result, the pressure on driven sheave 200 will be proportionally decreased. On the other hand, if $N_E$ is less than $N_{MAX}$, the input signal applied to clipping circuit 236 will be positive, resulting in a zero output signal applied to amplifier 210. Such an output signal has no affect on the summed output signal of amplifier 210; thus, no change in the signal supplied to the driven servo-controller 250 is produced.

Summing amplifier 230 and clipping circuit 234 act to increase pressure on the driven sheave 200 to decrease the load on the engine. Amplifier 230 receives $N_E$, applied to its negative input terminal, and $N_{MIN}$, applied to its positive input terminal, and produces a summed output signal $N_{MIN}-N_E$. This summed output is applied to a clipping circuit 234 similar to circuit 236. Circuit 234, however, has a non-linear transfer characteristic which produces a positive substantially linear output for positive excursions of its input signal and a zero output for negative excursions. Circuit 234 can be, for example, a forward baised diode. If $N_E$ falls below $N_{MIN}$, the input signal applied to clipping circuit 234 will be positive, thereby resulting in a positive output signal. This positive output signal is then applied to summing amplifier 210 to increase the value of its summed output signal in proportion to the amount $N_E$ is less than $M_{MIN}$. As a result, the pressure on driven sheave 200 will be proportionally increased. On the other hand, if $N_E$ is greater than $N_{MIN}$, then a zero output signal will be produced by circuit 234 which has no affect on the summed signal applied to servo-controller 250.

Pressure generator 200 also includes circuitry for adjusting the sensitivity of accelerator pedal 18, depending on vehicle speed, to more closely simulate the "feel" of a conventional vehicle. This is required because of the inherent operating characteristics of the engine and CVT. That is, at higher vehicle speeds, the torque produced by the engine remains fairly high and constant (see FIG. 2). In the conventional vehicle the remaining small percentage of torque which can be extracted from the engine is delivered to the rear wheels through a transmission in high gear with a fixed, very low reduction ratio. Vehicle acceleration is therefore fairly insensitive to accelerator pedal movement at high speeds. In a CVT equipped vehicle, however, depression of the accelerator pedal even at high vehicle speeds results in an increased reduction ratio and an associated multiplication of torque in excess of that provided in the conventional vehicle. Thus, if only direct accelerator pedal position $\alpha$ were used to control CVT ratio at higher vehicle speeds, vehicle response would be extremely sensitive to accelerator pedal movement. The sensitivity of the accelerator pedal 18 must therefore be dulled at higher vehicle speeds.

Pedal sensitivity is controlled by two comparators 212, 214. As long as vehicle speed is below a threshold equivalent of drive shaft speed $N_{DS}$ equal to or less than 1173 rpm, switch 216 remains closed to deliver the $\alpha$ signal directly to amplifier 210. This effectively is torque control. When drive shaft speed $N_{DS}$ exceeds 1173 rpm, switch 216 opens and switch 218 is closed so that a pedal position signal equivalent to $\alpha$ divided by $N_{DS}$ (provided by divider 220) is delivered to amplifier 210. This effectively is power control. In this way, the effect of any movement of accelerator pedal 18 in the higher speed ranges is diminished so as to move closely simulate the pedal response of a conventional automobile.

Figure 12:
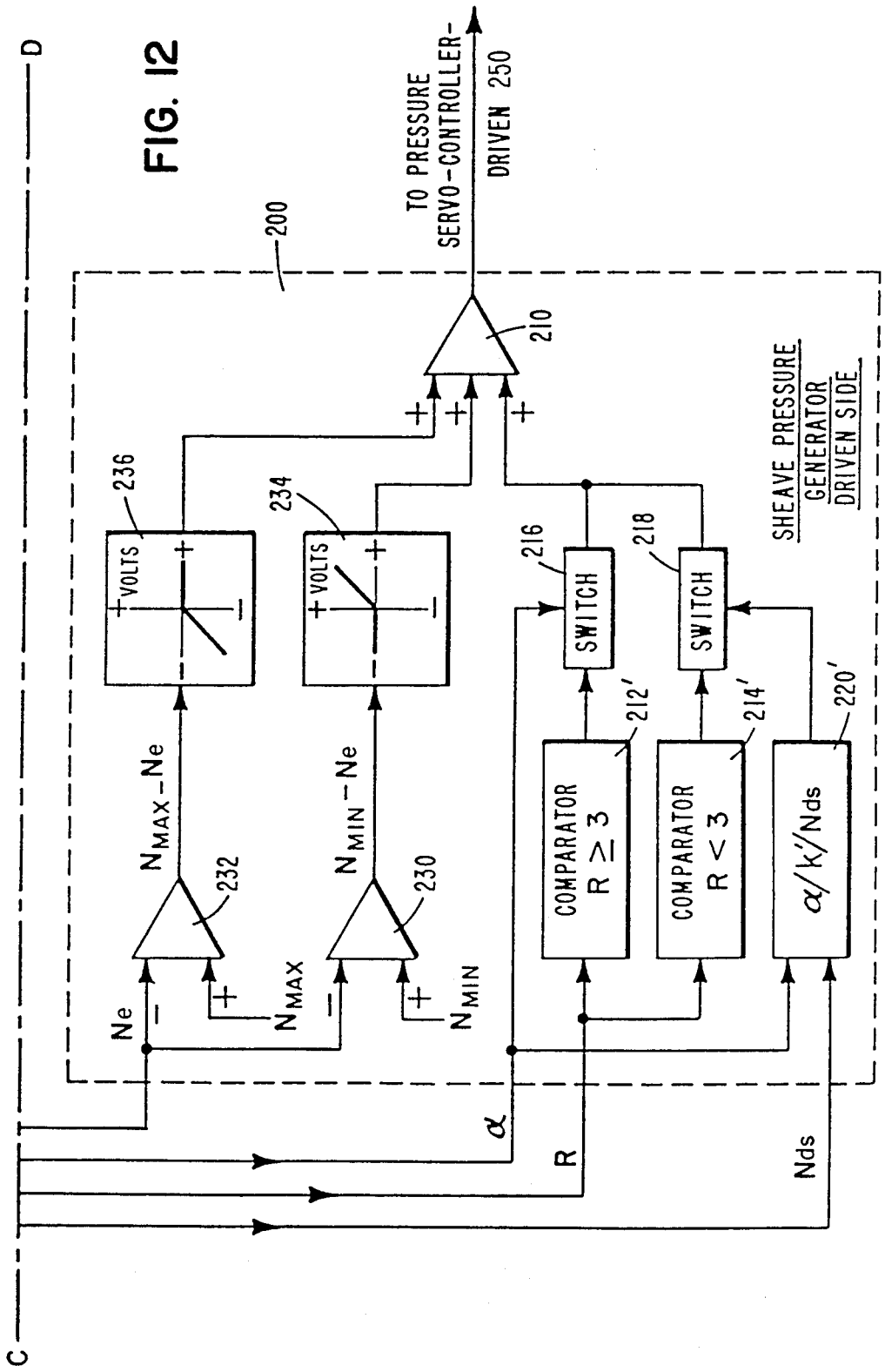
FIG. 12 illustrates a modification of the pressure generator for the driven sheave illustrated in FIG. 10.

FIG. 12 shows a modification of the sheave pressure generator 200, wherein accelerator sensitivity is controlled as a function of ratio R. Comparator 212' closes switch 216' to connect the accelerator pedal position signal $\alpha$ directly to amplifier 210 when ratio R equals or exceeds 3. The comparator 214' closes switch 218' to feed a dulled signal to amplifier 210 from divider 220' when ratio R is below 3.

The control of transmission ratio described above actually is a ratio rate control, $\dot{R}$. That is, the greater the magnitude of the increase (or decrease) in fluid pressure on driven sheave 20 commanded by accelerator pedal 18, the more rapid the change of sheave diameters will be. Thus, for example, a rapid depression of accelerator pedal 18 will result in a rapid change of CVT ratio and quick acceleration. This, of course, closely simulates the characteristics of a conventional vehicle.

The fundamental control of the instant invention involves, in part, the recognition that control of the ratio rate $\dot{R}$ of the CVT, rather than merely the CVT ratio, yields improved CVT control. This improved control is explained by reference to the following derived vehicle performance equation:

$$\dot{N}_{DS} = \frac{-\dot{R} I_E N_E}{I_{EQ}} + \frac{R T_E - T_{RL} - T_{loss}}{I_{EQ}}$$

where
$I_{EQ} = I_{CDS} + R^2 I_E$,
$\dot{R}$ is the ratio rate of the transmission,
R is the ratio of the transmission,
$I_E$ is engine inertia,
$N_E$ is engine speed,
$T_E$ is engine torque,
$T_{RL}$ is road load torque reflected to the drive shaft and includes tires, final drive and axle losses,
$T_{loss}$ is transmission loss,
$I_{CDS}$ is car inertia reflected to the drive shaft, and
$\dot{N}_{DS}$ is vehicle acceleration measured at the drive shaft.

It is clear that the acceleration of the vehicle $\dot{N}_{DS}$ is dependent primarily upon control of any one or more of these variables such as, for example, $T_E$, R or $\dot{R}$. Generally, conventional vehicle systems vary the transmission ratio R and engine output torque $T_E$ provide the required transmission and vehicle control. By controlling R, however, it is difficult to constantly maintain engine torque and speed along the ideal operating line. This is due to the fact that each time R is varied, the load on the engine is changed which, in turn, affects the engine's output torque and vehicle acceleration.

Attempts to simultaneously change the engine torque and speed to force engine operation back on the ideal line have necessitated very complex control systems, since control is dependent on several variables of the performance system. For example, these systems must necessarily perform the complicated task of calculating the necessary target throttle position and CVT ratio R to force engine operation back on the ideal line. These systems also require the calculation of ratio rate $\dot{R}$ so that the rate in changing the ratio to the target value does not result in undesirable vehicle dynamics. For example, if $\dot{R}$ is selected to be excessive then an undesirable deceleration of the vehicle will occur before the vehicle can accelerate. This phenomenon results from the negative sign of the $\dot{R}$ term in the above performance equation.

This invention, however, recognizes that $\dot{R}$ can easily be sensed and controlled without causing the other variables to adversely affect engine performance. This is accomplished by separating the engine control from the transmission control so that engine torque and speed are fixed along the ideal engine operating line.

More specifically, as shown in FIG. 11, the value of the throttle opening $\theta$, i.e., the control over the engine, is selected by selector circuit 60 which is switched to other state when a certain state of clutch is reached and a certain rotational speed of the engine is exceeded. The CVT ratio, i.e., the control over the transmission, is hydraulically controlled by selective switching means 63 which is switched to other state when the detected rotational speed of the engine deviates from the intended rotational speed.

As a result of controlling $\dot{R}$ no adverse affect on the other dependent variables occur. In particular, changing $\dot{R}$ alone, with its concomitant change on R, will not force engine operation off the ideal operating line since engine speed and torque are determined solely by the fuel function f ($N_E$). As a result, vehicle acceleration $\dot{N}_{DS}$ and output torque $T_0$ are controlled solely by ratio rate $\dot{R}$, rather than by the other variables of the performance system.

It has been discovered in accordance with this invention that rate of change of ratio ($\dot{R}$) is closely approximated by the following relationships:

$$k\dot{R} = \alpha - T_0 \text{ (for low speeds: torque control) and}$$

$$k\dot{R} = \frac{\alpha}{k'N_{DS}} - T_0 \text{ (for high speeds: power control)}.$$

In the V-belt traction drive CVT of the preferred embodiment of the invention, the comparison of accelerator pedal position $\alpha$ and output torque $T_0$ occurs inherently in the belt and pulley components to effect a ratio change at a rate $\dot{R}$. Other types of CVTs may require different control elements to effect this relationship. As stated earlier, however, other parameters indicative of system performance may be used to effect a ratio change at a rate $\dot{R}$, where $\dot{R}$ is proportional to the difference between the desired performance parameter and the actual measured performance parameter.

Figure 13:
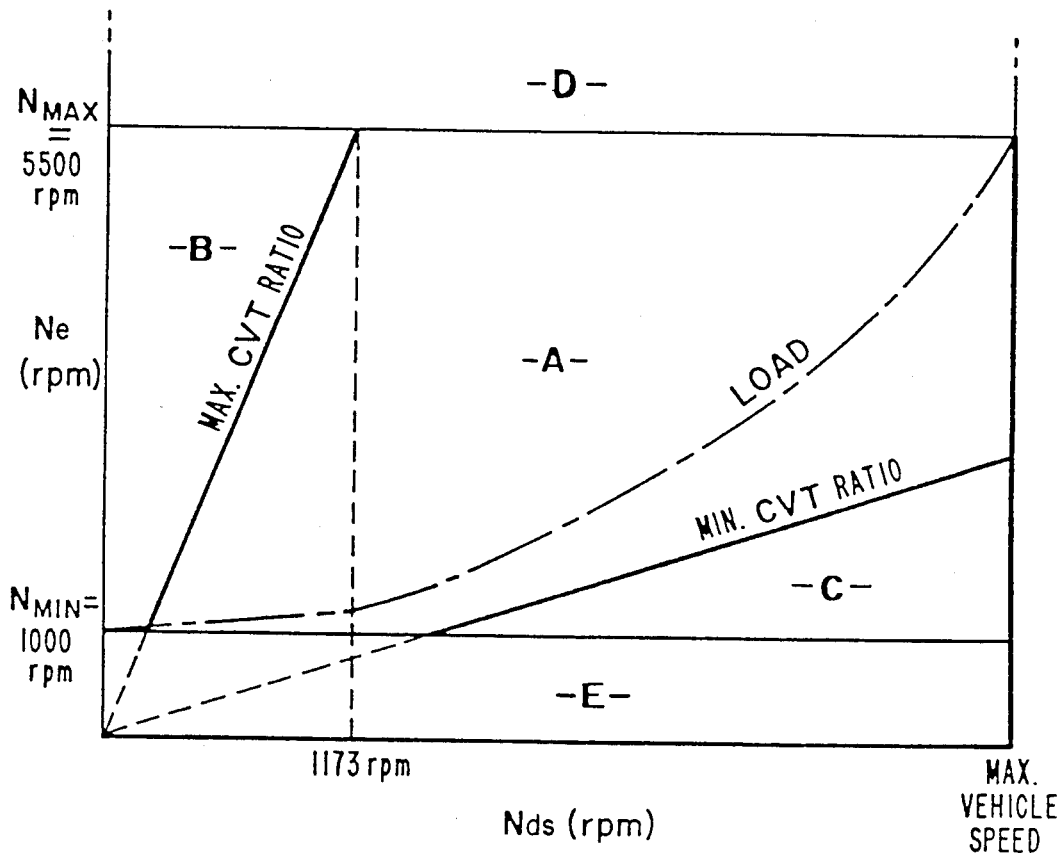
FIG. 13 is a graphical representation of the operation of an engine-CVT system in accordance with the control scheme of the invention.

The above described control scheme of the invention is graphically illustrated in FIG. 13. FIG. 13 is a plot of engine speed $N_E$ as a function of vehicle speed or drive shaft speed $N_{DS}$. The minimum and maximum CVT ratios are illustrated by the straight lines emanating from the origin of the graph. The idle speed ($N_{MIN}$=1000 rpm) is indicated by a lower horizontal line, while the maximum permissible engine speed ($N_{MAX}$=5500 rpm) is indicated by an upper horizontal line. The maximum vehicle speed is defined by a vertical line at the right hand edge of the graph.

The graph of FIG. 13 is divided into a number of discrete operating regions. "A" designates the normal region of operation of the engine-CVT system. Region "A" is bounded by the line of maximum CVT ratio, the line of maximum engine speed, the line of maximum vehicle speed, the line of minimum CVT ratio and the idle speed line. During operation of the system in region "A", clutch 40 is fully engaged and throttle position is wholly a function of engine speed in accordance with the fuel function f ($N_E$). Operation to the left of the dashed vertical line indicating a drive shaft speed of 1,173 rpm is under torque control, while operation to the right of this line is under power control (see the above two equations, and the accelerator pedal sensitivity circuitry illustrated in FIGS. 10 and 12.) Region "B" is the region of start-up control, that is, the operation of the engine-CVT system during slow vehicle operation when clutch 40 is only partially engaged. The control for this operation (400) is illustrated in FIG. 9.

Operation of the engine-CVT system in the remaining three regions "C", "D" and "E" is effectively prevented by the above described control system. That is, operation in region "C" is prevented by the physical limitation of minimum CVT ratio, and by the fuel diminishing circuits comprising fuel diminishing valve 11, pulse width modulator 110, differentiator 112 and fuel diminishing comparator 114 of engine control circuit 100 (FIG. 8). Region "D" is the region of overspeed control, governed by the fuel suspension mechanism 9 and fuel suspension comparator 108 of engine control circuit 100 (FIG. 8), and by amplifier 232 and clipping circuit 236 of sheave pressure generator 200 (FIG. 10). Region "E" is the region of engine idle control which is governed by amplifier 230 and clipping circuit 234 of sheave pressure generator 200 (FIG. 10).

Also shown on the graph of FIG. 13 is a load line which indicates the engine speed required to maintain any constant vehicle speed along a level road. The term "load" includes road load, final drive losses and the like, and represents the actual load on the engine-CVT system. In order for the control scheme of the invention to function only in accordance with the fuel function so as to maintain engine operation along the ideal operating line, it is desirable that the CVT ratio range include substantially all ratios required to maintain constant vehicle speed for any normally encountered load. That is, the minimum CVT ratio preferably is smaller than that required to maintain constant vehicle speed along a level road, and the maximum CVT ratio preferably is greater than that required to maintain constant vehicle speed up the steepest grade which one might expect to encounter. This relationship is graphically illustrated by the physical location of the load line in the graph of FIG. 13 above the line of minimum CVT ratio in region "A". All other load lines should lie below the line of maximum CVT ratio. A desirable CVT ratio range for accomplishing this is approximately 11:1 with, for example, a maximum CVT ratio of 22:1 (total vehicle ratio, including final drive ratio), and a minimum CVT ratio of 2:1. A transmission having such a wide ratio range is disclosed in commonly assigned U.S. application Ser. No. 290,293, filed Aug. 5, 1981. Of course, a CVT having a smaller ratio range would be operable, but would not have as much flexibility as one with a wider range.

Figure 7:
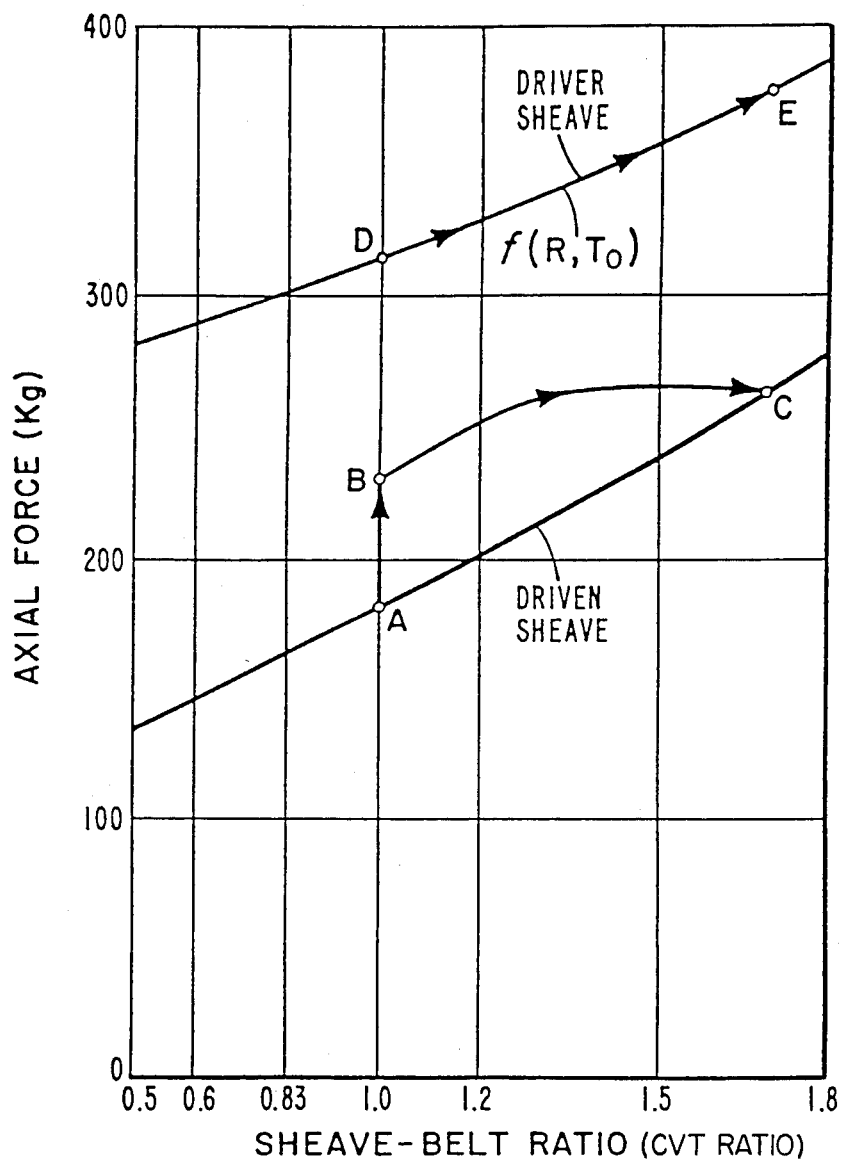
FIG. 7 is a graph which shows the forces applied to the driver and driven sheaves of the CVT as a function of transmission ratio.

Referring to FIG. 7, the mechanics of a change in CVT ratio now will be described with reference to the axial forces produced by the pressurized fluid in chambers 26 and 36. The lower curve in FIG. 7 is a plot of steady state axial force on movable portion 24 of driven sheave 20 as a function of CVT ratio. Similarly, the upper curve is a plot of steady state axial force tending to resist inward movement of movable portion 34 as a function of CVT ratio. As described below, when for example a signal is generated to increase the ratio of the CVT from 1.0 to approximately 1.7, the fluid pressure in chamber 26 is increased to raise the axial force from approximately 175 kg. to, ultimately, approximately 270 kg. Movable portion 24 does not move instantaneously, however, due to the inertia of the system. Accordingly, the curve which represents the transient change taking place in sheave 20 is defined by movement from point A to point B at a constant ratio of 1.0, and then to point C where equilibrium is reached. Correspondingly, an increase in pressure in chamber 36 of driver sheave 30 results in an increase in axial force on movable portion 34 of sheave 30 from approximately 315 kg. (point D) to approximately 380 kg. (equilibrium point E). Despite this increase in axial force, the increased tension on belt 15 occasioned by expansion of the diameter of sheave 20 forces the two portions 32, 34 of sheave 30 apart so that sheave 30 has a smaller driving diameter. Driver sheave 30, therefore, follows in a controlled manner any change occurring to driven sheave 20.

Sheave pressure generator 300 generates a pressure appropriate for driver sheave 30 as a function of ratio R and measured output torque $T_0$. This function has been found to satisfactorily tension belt 15, without undue stress, and effect a smooth change of ratio. An example of a function suitable for this purpose is as follows:

$$P_{DR} = K_1 + (K_2/R + K_3) T_0$$

where $R_{DR}$ is the fluid pressure in chamber 36 of driver sheave 30, and $K_1$, $K_2$ and $K_3$ are appropriately selected constants.

The above-described control scheme quite simply and effectively accomplishes its primary objective of maintaining engine operation along the ideal operating line of minimum fuel consumption. Transmission control requires output torque and accelerator pedal position sensing, while engine control requires only engine speed sensing.

However, even the aforementioned control mechanism needs an additional control system to cope with every circumstance that might take place while the vehicle is in motion. Specifically, if the driver releases the accelerator pedal suddenly while the vehicle is traveling, the above-described control over the engine can be had according to the speed of reduction ($-\alpha$) of the pedal position, but the CVT cannot be sufficiently controlled. This is attributed to the fact that the signal produced by driven sheave pressure generator 200 is delivered to driven pressure servo-controller 250 as a function of pedal position signal $\alpha/N_{DS}$ that is supplied from divider 220. If the accelerator position $\alpha$ drops suddenly to zero, the diameter of driven sheave 20 is reduced, so that the CVT ratio assumes a value of $R_{MIN}$.

This problem is solved by adding to the fundamental control system a CVT control system that controls the CVT according to the accelerator position $\alpha$ while the vehicle is in motion. As shown in FIG. 1, in the CVT control system, the hydraulic pressure produced by generators 200 and 300 acts on controllers 250 and 350 and on hydraulic pressure distribution circuit 500 via deceleration control circuit 750, which operates under the instructions from deceleration-judging circuit 700. This judging circuit 700 responds to its input signal, if it signifies that the accelerator position $\alpha$ is less than the predetermined value $\alpha_0$ and that the CVT ratio is less than the predetermined value $R_{MAX}$, and the circuit 700 holds the pressure produced by the generators 200 and 300. Then, the circuit 700 causes deceleration control circuit 750 to modify the hydraulic pressure using the held pressure as a reference. The control circuit 750 determines the CVT ratio R from the velocity $N_{DS}$ of the driving shaft, and it modifies the hydraulic pressure in such a way that the actually measured value of R approaches the determined value of R. The resulting signal is delivered to controllers 250 and 350.

Figure 14:
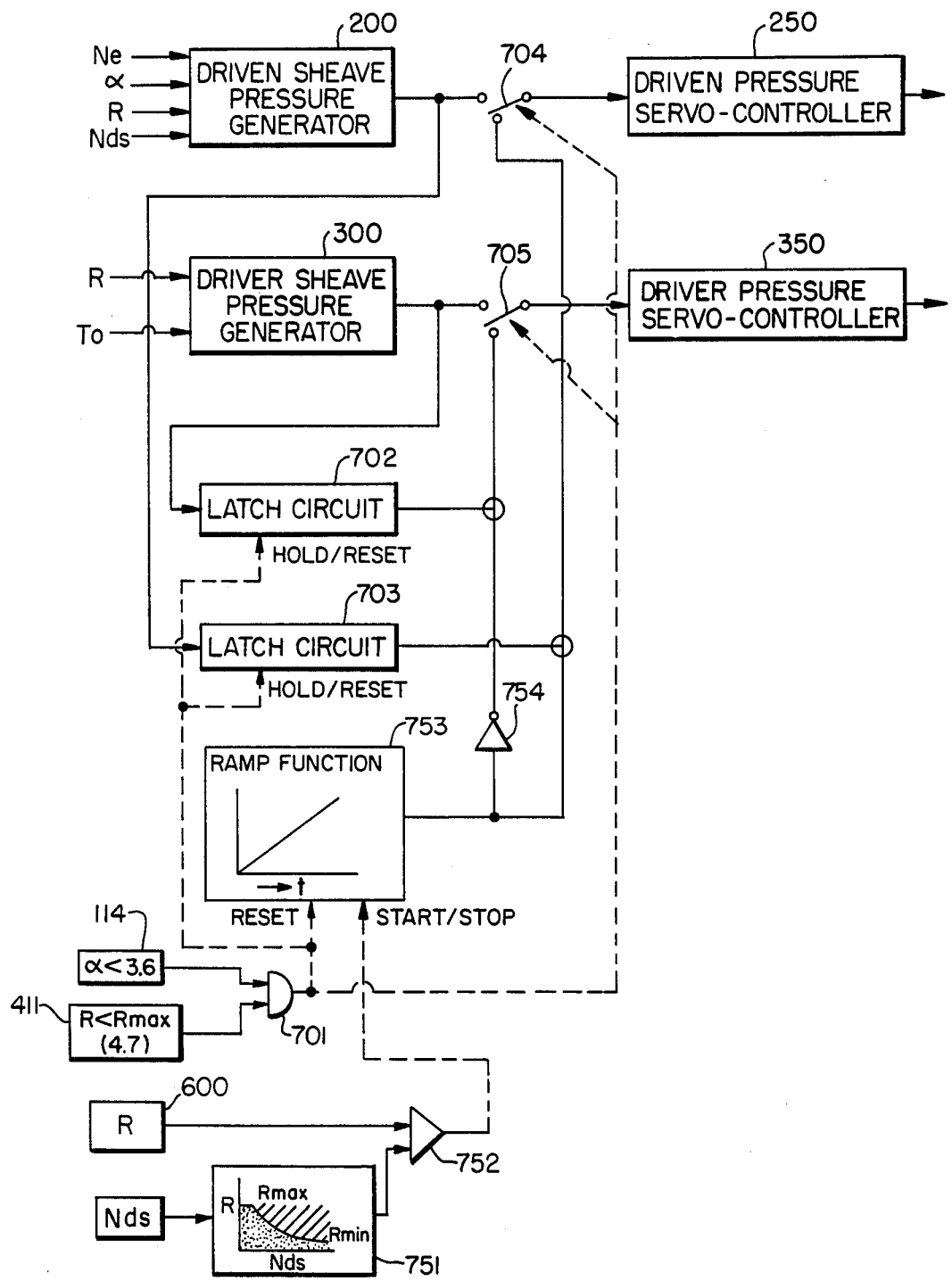
FIG. 14 is a circuit diagram specifically showing main portions of the CVT control system according to the invention.

This CVT control system is specifically shown in FIG. 14, where deceleration-judging circuit 700 consists of AND circuit 701, two latch circuits 702, 703, and two switches 704, 705. Deceleration control circuit 750 is composed of map 751, comparator 752, output circuit 753, and inverter circuit 754. The map 751 acts to determine the optimum value of the CVT ratio R from the velocity $N_{DS}$ of the driving shaft.

AND circuit 701 receives a signal indicative of the accelerator position $\alpha$ and a signal indicative of the CVT ratio R. If these satisfy certain conditions, AND circuit 701 issues instructions to the two latch circuits 702 and 703 and to output circuit 753. One of the certain conditions is that the accelerator position $\alpha$ is equal to or less than 3.6%, while the other is that CVT ratio is equal to or less than 4.7%. The instruction given to the two latch circuits 702 and 703 at that time is "HOLD", whereas the instruction issued to output circuit 753 is "RESET".

The requirement that the accelerator position be equal to or less than 3.6% is set, because this is the threshold value for lowering the fuel flow to the engine. The requirement that the actually measured value of CVT ratio be equal to or less than 4.7 is established, because this is the threshold value for disengaging clutch 40. If certain conditions are fulfilled, AND circuit 701 operates to switch the switches 704 and 705 to latch circuits 702 and 703.

Latch circuit 702 receives the output from driver sheave pressure generator 300, holds the level of this output, adds the output from output circuit 753 to the signal inverted by inverter circuit 754, and supplies the resulting signal to driver pressure servo-controller 300 via switch 705. Latch circuit 703 receives the output from driven sheave pressure generator 200, holds the level of this output, adds it to the output from output circuit 753, and furnishes the resulting signal to driven pressure servo-controller 250 via switch 704.

Figure 15:
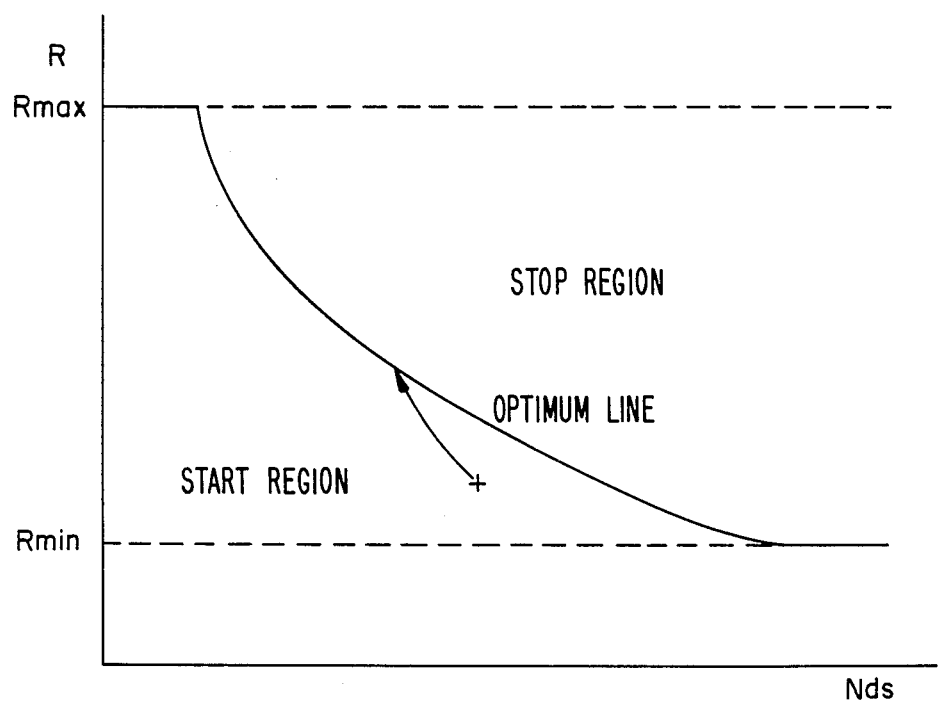
FIG. 15 is a graph showing the optimum line for CVT ratio.

Comparator 752 receives a signal indicative of the optimum value of the CVT ratio R determined from the driving shaft velocity $N_{DS}$, as well as a signal indicative of the actually measured value of the CVT ratio R. When the optimum value is in excess of the measured value, comparator 752 delivers "START" signal to the output circuit, while when the optimum value is less than the latter value, it delivers "STOP" signal. A ramp function that varies with time t is used for output circuit 753, which is reset by "RESET" signal from AND circuit 701 and produces an output whose amplitude is proportional to time t. When this CVT control system operates and an actually measured value of CVT ratio R that is below the optimum line shown in FIG. 15 is applied, comparator 752 issues "START" instruction to output circuit 753. The output is added to the outputs from latch circuits 702 and 703, and the resulting signals are applied to their respective controllers 250 and 350. When the difference between the actually measured value and the optimum line is reduced down to zero, comparator 752 issues "STOP" instruction, and the value taken at that time is held. Further, when either the requirement $\alpha < 3.6$ or $R < R_{MAX}$ is not catered for, "RESET" instruction is issued to the two latch circuits 702 and 703. Then, controllers 250 and 350 are controlled by generators 200 and 300.

The specific parameter values set forth in the preferred embodiment described above are in no way intended to limit the scope of the invention, it being apparent that these parameters will vary in accordance with engine, transmission and vehicle design, and desired behavior and performance. While an electronic control system has been schematically illustrated in the preferred embodiment, it is to be understood taht any type of control system which functions in a similar manner may be used. It would appear that a control system incorporating many mechanical components would perhaps be the most reliable and least expensive alternative.

What is claimed is:

1. A CVT control method comprising the steps of:
delivering a signal indicative of a reference transmission gear ratio to a driver means of a stepless variable speed gear according to signals produced by detecting running conditions of a vehicle to which the method is applied;
judging the vehicle to decelerate, according to both a signal produced in response to the accelerator pedal of the vehicle and a signal indicative of the transmission gear ratio of the vehicle; and
modifying the signal indicative of the reference transmission gear ratio so as to conform to the transmission gear ratio determined by the speed of the vehicle, according to both a signal produced by the judgment made as described above and a signal indicative of the speed of the vehicle.

2. The CVT control method of claim 1, wherein said signal indicative of the reference transmission gear ratio is a signal which is supplied to a driver means for a driven member and which is indicative of the opening of the accelerator pedal.

3. A CVT control apparatus comprising:
a reference driver means for delivering a signal indicative of a reference transmission gear ratio to a driver means of a stepless variable speed gear according to signals produced by detecting running conditions of a vehicle;
a deceleration-judging means for judging the vehicle to decelerate, according to both a signal produced in response to the accelerator pedal of the vehicle and a signal indicative of the transmission gear ratio of the vehicle; and
a deceleration control means that receives both the signal from the deceleration-judging means and a signal indicative of the speed of the vehicle to modify the output signal from the reference driver means so as to conform to the transmission gear ratio determined by the speed of the vehicle.

* * * * *